United States Patent [19]

Watson

[11] Patent Number: 4,666,644
[45] Date of Patent: May 19, 1987

[54] METHOD OF MAKING ASYMMETRICAL LAYERED STRUCTURES FROM POLYALKYLENE SULFONE RESINS

[75] Inventor: Barry Watson, Toledo, Ohio

[73] Assignee: Owens-Illinois, Inc., Toledo, Ohio

[21] Appl. No.: 779,006

[22] Filed: Sep. 23, 1985

Related U.S. Application Data

[62] Division of Ser. No. 548,386, Nov. 3, 1983, Pat. No. 4,568,579.

[51] Int. Cl.$^4$ .................. B01D 13/04; B01D 59/10; C08J 9/28
[52] U.S. Cl. .......................... 264/41; 55/16; 55/158; 264/178 R; 264/209.1; 264/216
[58] Field of Search ............ 264/41, 216, 178 R, 264/209.1; 55/16, 158

[56] References Cited

U.S. PATENT DOCUMENTS

| | | | |
|---|---|---|---|
| 3,651,030 | 3/1972 | Desaulniers et al. | |
| 3,728,185 | 4/1973 | Gray | 156/89 |
| 3,855,122 | 12/1974 | Bourganel | 264/41 X |
| 3,875,096 | 4/1975 | Graefe et al. | 264/41 X |
| 3,928,294 | 12/1975 | Crawford et al. | 210/500 M X |
| 4,026,977 | 5/1977 | Bourganel | 264/41 |
| 4,029,582 | 6/1977 | Ishii et al. | 264/41 X |
| 4,286,015 | 8/1981 | Yoshida et al. | 264/41 X |
| 4,481,260 | 11/1984 | Nohmi | 264/41 X |

OTHER PUBLICATIONS

Cabasso, Israel; Elias Klein and James K. Smith "Polysulfone Hollow Fibers. I. Spinning and Properties", in *Journal of applied Polymer Science*, vol. 20, 2377–2394 (1976).

*Primary Examiner*—Philip Anderson
*Attorney, Agent, or Firm*—John R. Nelson

[57] ABSTRACT

Asymmetrical layered structures such as asymmetrical films are disclosed. The main body section contains a multitude of pores (voids). A thin surface skin is free of pores. The entire structure is fabricated from a polyalkylene sulfone resin in which the alkylene moiety contains 6 to 18 carbon atoms. Processes for preparing the structures also are disclosed. The structures are semipermeable to gases and are used as membranes to enrich the oxygen content of oxygen/nitrogen mixtures.

10 Claims, 4 Drawing Figures

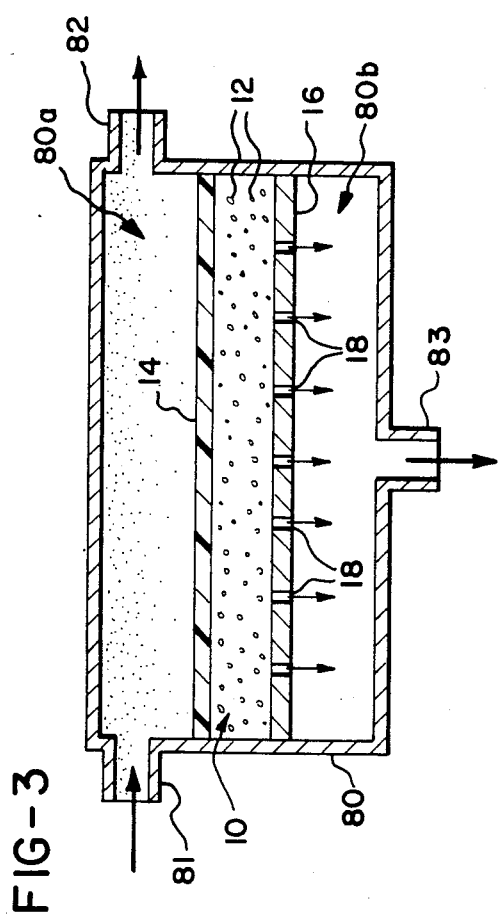
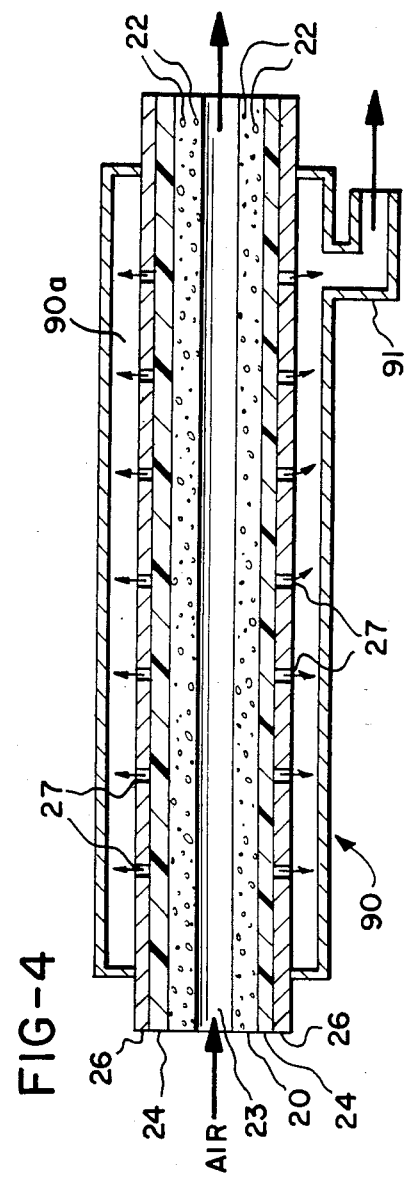

METHOD OF MAKING ASYMMETRICAL LAYERED STRUCTURES FROM POLYALKYLENE SULFONE RESINS

This is a division of application Ser. No. 548,386 filed 11-3-83, now U.S. Pat No. 4,568,579 issued Feb. 4, 1986.

BACKGROUND OF THE INVENTION

The atmosphere is composed of approximately 78% by volume nitrogen and 21% by volume oxygen, with other gases, principally argon, constituting less than 1% by volume. In most industrial processes requiring oxygen, air is used as the oxygen source. For certain industrial processes and in certain medical treatment procedures, there is a need to enrich the oxygen content of air. Where such needs exist, the air is enriched by being mixed with essentially pure oxygen obtained by low temperature fractionation of liquid air. The preparation of such oxygen-enriched airs is inherently expensive by reason of the large amount of energy required to liquify air. It is apparent that there is a long-term and continuing interest in the development of lower cost processes for providing oxygen/nitrogen gas mixtures having an oxygen content in excess of the 21 volume % level present in air.

It is known that both nitrogen and oxygen can pass through thin films of certain polymeric materials such as polyesters, nylons, polyethylene, diene rubbers such as natural rubber and polybutandiene, silicone rubbers, polyalkylene sulfones, and others. The rate at which a gas permeates or diffuses through a polymeric membrane is defined by Formula (1).

$$J = \frac{P \cdot \Delta P \cdot A}{t} \quad (1)$$

where:

J is the gas flow rate (flux) through the membrane expressed in
($cm^3$ at STP)$\cdot cm^{-2} \cdot sec^{-1} \cdot cm$ $Hg^{-1}$.

P is the permeability constant of the membrane expressed in
($cm^3$ at STP)$\cdot cm \cdot cm^{-2} \cdot sec^{-1} \cdot cm$ $Hg^{-1}$.

$\Delta P$ is the differential pressure across the membrane expressed in cm Hg.

A is the cross-sectional area of the membrane expressed in $cm^2$.

t is the membrane thickness expressed in cm.

The permeability constant, i.e., P in Formula (1), is a function both of the polymeric material from which the membrane is fabricated and the particular gas permeating the membrane. With all known polymeric membranes, the permeability constant for oxygen is higher than the corresponding permeability constant for nitrogen. The difference between the permeability constants for oxygen and nitrogen suggests that a oxygen/nitrogen gas mixture enriched in oxygen can be prepared by passing air through a polymeric membrane. The amount of oxygen enrichment possible is a function of the difference in the two permeability constants, which can be characterized as an ideal separation factor $\alpha$ which is defined by Formula (2).

$$\alpha = P_{O_2}/P_{N_2} \quad (2)$$

While the possibility of enriching the oxygen content of oxygen/nitrogen mixtures by passing air through a polymeric membrane is theoretically attractive, to date a number of factors have prevented any significant use of this technique. For such a system to be economically attractive, the membrane selected should have both a high permeability constant for oxygen and a large ideal separation factor. Permeability constants and ideal separation factors for oxygen and nitrogen obtained with a number of representative polymers are shown in Table I.

TABLE I

| Polymer | $P_{O_2}$[1] | $P_{N_2}$[2] | $\alpha O_2/N_2$ |
|---|---|---|---|
| Polyethylene Terephthalate | 0.022 | 0.005 | 4.4 |
| Nylon 6 | 0.038 | 0.010 | 3.8 |
| Butyl Rubber | 1.3 | 0.31 | 4.2 |
| Polyethylene | 3.0 | 1.3 | 2.3 |
| Polystyrene | 6.4 | 2.2 | 2.9 |
| Natural Rubber | 30 | 12 | 2.7 |
| Silicone Rubber | 600 | 260 | 2.3 |

[1]$P_{O_2} \times 10^{-10}$
[2]$P_{N_2} \times 10^{-10}$

The above data indicate that, invariably, polymers having large ideal separation factors have low permeability constants for oxygen. Similarly, polymeric materials having large permeability constants for oxygen have relatively small separation factors. Thus, to obtain significant oxygen enrichment of oxygen/nitrogen mixtures, it is necessary to accept low oxygen permeability constants. To obtain significant gas flow across a membrane, it is necessary to accept low levels of oxygen enrichment.

To obtain significant flow rates through a membrane, the membranes employed must be very thin. Obviously, very thin membranes are difficult to fabricate and are quite fragile and subject to frequent breakage.

It is apparent that, if oxygen enrichment of oxygen/nitrogen gas mixtures is to be obtained on a practical basis, it is essential that the art develop thin gas permeable membranes which have reasonable mechanical strength, have reasonably high oxygen permeability coefficients, and have reasonably high $O_2/N_2$ separation factors. It is the principal object of this invention to prepare such membranes.

SUMMARY OF THE INVENTION

The invention is directed to gas permeable asymmetrical layered structures of polyalkylene sulfone resins having oxygen permeability constants and oxygen/nitrogen separation factors such that the asymmetrical layered structures are well suited for use as a membrane to enrich the oxygen content of an oxygen/nitrogen mixture by passing an oxygen/nitrogen gas mixture through such a membrane The principal body section of the asymmetrical structure has a multitude of small pores distributed substantially uniformly therethrough. One surface of the structure is homogeneous and is substantially free of pores. The cross sectional thickness of this surface film is substantially thinner than the cross-sectional thickness of the principal porous body section. The layered structures may take many forms, the principal forms of present interest being films and tubes. The entire assymetrical structure is fabricated from a polyalkylene sulfone resin in which the polymerized alkylene moiety contained therein as an alpha-alkylene which contains 6 to 18 carbon atoms.

The invention also is directed to processes for preparing asymmetrical layered structures of polyalkylene sulfone resins of the type described above. In the first step of the process, a thin layer of a solution of a polyalkylene sulfone resin is prepared. The solution is saturated with a polyalkylene sulfone resin in a solvent mixture consisting of a good solvent for the resin and a poor solvent for the resin. In the next step of the process, the good solvent for the resin is evaporated preferentially from the surface layer of the solution to lower the solubility of the polyalkylene sulfone resin in the surface layer The article thus formed is next immersed in a water-miscible precipitant to precipitate essentially all of the polyalkylene sulfone resin contained in the layered structure. Finally, the article is contacted with a non-solvent and/or water for a time period sufficient to extract therefrom essentially all of the polyalkylkene sulfone solvent and the precipitant In further embodiments, the invention is directed to apparatus for enriching the content of a desired gas in a gas mixture. Such apparatus includes a membrane fabricated from an asymmetrical layered structure as described above. Processes for enriching the oxygen content of oxygen/nitrogen mixtures by use of such apparatus are also included within the invention.

BRIEF DESCRIPTION OF THE DRAWINGS

FIG. 3 is a side elevation, partially in section, of apparatus for enriching a gas present in a gas mixture employing an asymmetric film of the invention as the permeable membrane.

FIG. 4 is a side elevation, partially in section, of apparatus for enriching a gas present in a gas mixture employing as the permeable membrane tubing of the invention which has an asymmetrical wall.

DETAILED DESCRIPTION OF THE INVENTION

Figure 1:
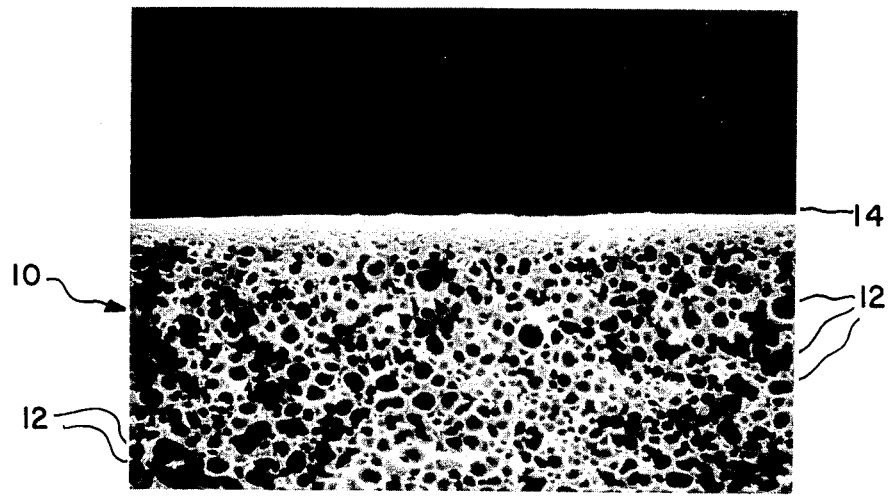
FIG. 1 is a photomicrograph of a section of an asymmetrical film of the invention.

An asymmetrical polyalkylene sulfone film of the invention is illustrated in FIG. 1, which is photomicrograph at a magnification of 1500X taken through a section of the film prepared in Example 1, subsequently described. The structure includes a main body section 10 having a multiplicity of pores 12 distributed substantially uniformly therethrough. The pores 12 occupy approximately 50 volume % of the main body section of the structure. The surface layer 14 is quite thin and is substantially free of pores or other openings. Typically, layer 14 will have a thickness on the order of 1 micron.

Figure 2:
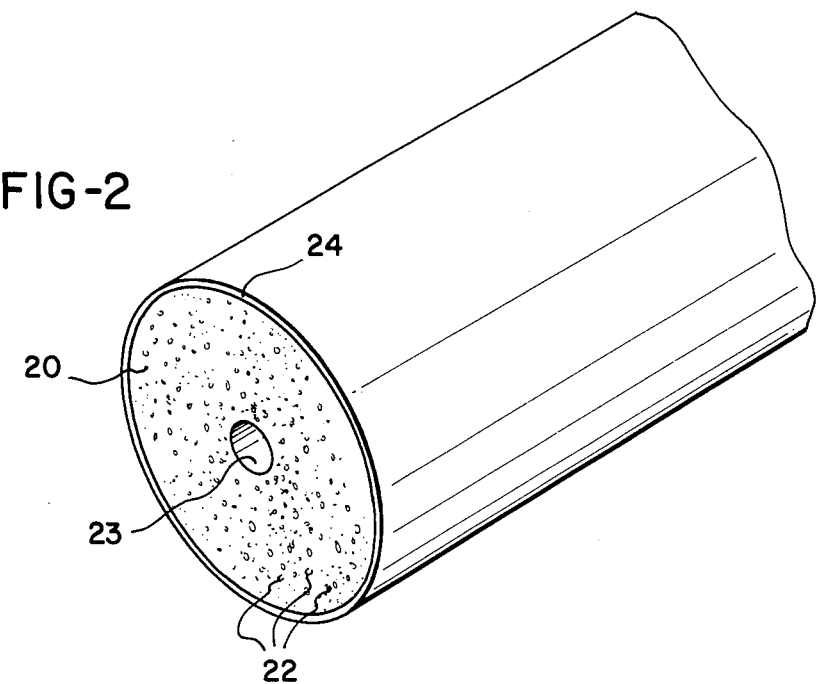
FIG. 2 is a perspective view, partially in section 3 of an asymmetrical tube of the invention.

FIG. 2 is a drawing of a tube having an asymmetrical wall section. The wall has a main body section 20 having a plurality of pores 22 uniformly distributed throughout section 20. The thin outer surface or skin 24 of the wall is substantially free of pores or other openings The thickness of surface layer or skin 24 is substantially the same as the thickness of the surface layer 14 of the film shown in FIG. 1 and described above. The pores 22 occupy about 50 volume % of the main body section 20. A center core or gas passageway 23 is provided in the tube.

The asymmetrical layered structures of the invention are fabricated from polyalkylene sulfone resins in which the alkylene groups polymerized therein are alpha-alkylenes which contain 6 to 18 carbon atoms. Such polyalkylene sulfone resins and their method of preparation are described in the prior art. See for example U.S. Pat. No. 3,928,294 and the references discussed therein, the disclosure of such patent and the references referred to therein being incorporated herein by reference. Such resins have a structure in which each polymerized alkylene group is linked to two sulfone groups in a head-to-tail arrangement. Several properties of such polyalkylene sulfone resins are described in U.S. Pat. No. 3,928,294, including the oxygen permeability rate through such resins.

The polyalkylene sulfone resins from which the asymmetrical layered structures are fabricated have low to intermediate oxygen permeability constants and good separation factors. When employed as conventionally prepared films or tubes, they suffer from the prior art deficiencies previously discussed i.e., they are fragile and lack strength when sufficiently thin to provide a good gas flux, or have a poor gas flux when fabricated as thicker films having better strength.

By reason of their physical structure, the asymmetrical layered structures of the invention have a unique combination of good physical strength, good gas flux values, and good separation factors. The relatively thick porous layer provides adequate physical strength to the structures. By reason of its pores, which are at least partially interconnected, the thick porous layer is very permeable to all gases. The surface layer is very thin and, for this reason, the gas flux through the layered structure is quite good, not withstanding the relatively low gas permeability constants of the polyalkylene sulfone resin from which the structure is fabricated. In typical articles of the invention, the porous layer will have a thickness in the range of about 0.004–0.02 inch and preferably about 0.008–0.012 inch. The non-porous surface layer will be as thin as possible, typically in a range of from about 0.02 micron to a maximum of about 10 microns. Asymmetrical layered structures having such thicknesses typically will have oxygen fluxes ($J_{O2}$) of at least about $1 \times 10^{-7}$ (cm$^3$ at STP)·cm$^{-2}$·sec$^{-1}$·cm Hg$^{-1}$ as measured across an area of 1 cm$^2$ at an pressure of 1 cm Hg.

The asymmetrical films of the invention can be prepared from casting solutions of critical composition. Such casting solutions consist of an essentially saturated solution of the polyalkylene sulfone resin in a mixed solvent system. One component of the casting solution is a good solvent having the capability of dissolving at ambient temperature at least about 30 parts of the polyalkylene sulfone resin in 100 parts by weight of such solvent. The second component of the solvent mixture—solely for purposes of differentiating the types of solvents employed—is referred to as a non-solvent by reason of the fact that it will have the limited capacity of dissolving not more than 1 part of the polyalkylene sulfone resin in 100 parts by weight of such non-solvent.

The polyalkylene sulfone resin-containing casting solution will be formulated to contain about 15–30, preferably 20–25, and more especially about 25 weight % of polyalkylene sulfone resin. The solvent/non-solvent mixture in which the polyalkylene sulfone resin is dissolved will have the solvent and non-solvent present in a ratio such that the resulting solution is essentially saturated with resin at ambient temperature. With the solvent/non-solvent systems preferred for use in the invention, the solvent will be present in a ratio of about 0.5 to 1.5 parts by weight per 1 part by weight of the non-solvent.

The solvent included in the polyalkylene sulfone resin-containing casting solution must meet several requirements to be useful in the practice of the invention.

Initially, as described supra, the solvent must have the capability at ambient temperature of dissolving at least about 30 parts by weight of the polyalkylene sulfone resin per 100 parts by weight of such solvent. In addition, it must have a relatively low atmospheric boiling point, preferably below about 70° C. In addition, it must be miscible with the non-solvent, water, and a "precipitant" subsequently described. The preferred solvents for use in the formulation of such casting solutions are aliphatic ketones and ethers. Examples of suitable solvents include acetone and tetrahydrofuran.

The non-solvents included in the casting solutions also must meet several criteria. As earlier noted, such non-solvents must have the limited capacity at ambient temperature of dissolving not more than about 1 part by weight of the polyalkylene sulfone resin in 100 parts by weight of such non-solvent. The non-solvent also must have an atmospheric boiling point at least about 5° C. higher than the atmospheric boiling point of the solvent included in the casting solution. Finally, the non-solvent must be miscible with the solvent, water, and the "precipitant" subsequently described. Alkanols such as methanol, ethanol, the butanols and the like are the non-solvents presently preferred for use in the processes of the invention.

The casting solutions are prepared most easily and preferably by first preparing a concentrated stock solution of the polyalkylene sulfone resin in the solvent. Typically, such stock solution will contain at least about 30, and preferably at least about 40, weight % of the polyalkylene sulfone resin dissolved in the solvent. This stock solution then is dilluted with an appropriate quantity of the non-solvent to prepare a casting solution having the desired content of the polyalkylene sulfone resin.

To prepare asymmetrical films, a thin layer of the casting solution is laid down on a flat surface to prepare a layer having a thickness on the order of about 0.02 inch. The wet film as cast is permitted to stand either at ambient temperature or at a moderately elevated temperature for a period of about 0.05–2.0 minutes. The solvent contained in the casting solution, by reason of having a lower boiling point than the non-solvent, evaporates from the surface of the casting solution at a faster rate than the non-solvent. As the concentration of the non-solvent is increased in the surface layer, the solubility of the polyalkylene sulfone resin in the surface layer is decreased. Some resin precipitation may take place, possibly as a gel swollen with solvent. The structure then is immersed into a liquid "precipitant" which is miscible with both the solvent and the non-solvent originally present in the casting solution. The precipitant will have a limited ability to dissolve the polyalkylene sulfone resin, and frequently will be identical to the non-solvent included in the original casting solution. As the precipitant is miscible with both the solvent and the non-solvent of the casting solution, it penetrates the entire film structure and precipitates essentially all of the polyalkylene sulfone resin.

In the final step of the process, the bilayered film structure from the previous step is washed with a non-solvent and/or water to remove all of the solvent from the structure. The asymmetrical structure then is dried.

As noted above, the polymer solution cast on a supporting surface is permitted to stand for a short period of time to permit preferential evaporation of solvent before the cast solution is contacted with the precipitant. Although not yet demonstrated experimentally, it may be possible to omit the evaporation step entirely.

Tubes having asymmetrical wall sections can be prepared in a similar manner. The polyalkylene sulfone casting solution will be extruded as a tube into air, with air or another inert gas being maintained within the center of the tube to prevent its collapse. Apparatus and techniques for extruding hollow tubes are disclosed by Cabasso, Klein and Smith, *Journal of Applied Polymer Science*, Vol. 20, 2377–2397 (1976), which descriptions are incorporated herein by reference. The extruded tube then is fed into a bath containing a precipitant of the type discussed previously. The distance between the tip of the extrusion die and the precipitant bath is set so that the freshly extruded tube is exposed to ambient air for about 0.05–2.0 minutes. The solvent contained in the casting solution, by reason of having a lower boiling point than the non-solvent, evaporates from the exposed surface of the casting solution at a faster rate than the non-solvent. As the concentration of the non-solvent is increased in the surface layer, the solubility of the polyalkylene sulfone resin in the exposed surface layer is decreased. Some resin precipitation may take place, possibly as a gel swollen with solvent.

When the extruded tube contacts the liquid precipitant, the precipitant penetrates the entire film structure and precipitates essentially all of the polyalkylene sulfone resin. After being contacted with the precipitant, the tube then is washed with a non-solvent and/or water to remove all of the solvent from the structure. The asymmetrical structure then is dried.

FIG. 3 is a side elevation of apparatus which can be employed to enrich a gas present in a gas mixture, e.g., oxygen in an oxygen/nitrogen mixture. The apparatus consists of a hollow body 80, which is divided into two chambers 80a and 80b by a gas permeable membrane. The membrane consists of an asymmetrical film of the type shown in FIG. 1 which is attached to a supporting sheet 16 fabricated from a suitable material such as metal to provide strength and rigidity to the membrane. A plurality of openings 18 are provided in sheet 16 to provide gas passageways. An inlet 81 is provided for admission of an oxygen/nitrogen mixture into chamber 80a, with an outlet 82 being provided so that the oxygen/nitrogen mixture can be passed continuously through chamber 80a. The apparatus is operated with a pressure differential being created and maintained across the membrane with the pressure in chamber 80a being higher than the pressure in chamber 80b. The pressure differential can be created by admitting the oxygen/nitrogen mixture through inlet 81 at a pressure somewhat higher than atmospheric pressure, with a one-way check valve not shown being provided in outlet 82 to provide a constant pressure in chamber 80a. An outlet 83 is provided in chamber 80b for removal of the oxygen-enriched oxygen/nitrogen mixture from chamber 80b. In an alternate operating mode, the pump connected to outlet 83 is operated to maintain a subatmospheric pressure in chamber 80b to establish the pressure differential across the membrane. In this operating mode, the pressure in chamber 80a customarily is maintained at atmospheric pressure.

The volume of gas passing across the membrane can be calculated from formula (1) set forth earlier herein. With a gas mixture such an an oxygen/nitrogen mixture, the total gas passing through the membrane is the sum of the flux for oxygen ($J_{O2}$) and the flux for nitrogen ($J_{N2}$), i.e.:

$$J_{total} = J_{O2} + J_{N2} \tag{3}$$

The flux J for each gas is a function of (a) the permeability constant for the gas through the membrane, (b) the cross-sectional area of the membrane, (c) the thickness of the membrane, and (d) the pressure differential across the membrane, i.e., the pressure in chamber 80a minus the pressure in chamber 80b. Since the gas is present in a mixture with a second gas, the flux also is a function of its volume fraction in the gas mixture. Thus, the flux for oxygen in an oxygen/nitrogen mixture is defined by formula (4):

$$J_{O2} = \left( \frac{P \cdot \Delta P \cdot A}{t} \right) \cdot \left( \frac{\text{Vol \% O}_2}{100} \right) \tag{4}$$

Similarly, the flux for nitrogen in an oxygen/nitrogen mixture is defined by formula (5):

$$J_{N2} = \left( \frac{P \cdot \Delta P \cdot A}{t} \right) \cdot \left( \frac{\text{Vol \% N}_2}{100} \right) \tag{5}$$

The enrichment of the desired gas can be calculated from (1) the volume fraction of the desired gas in the gas mixture, and (2) the ideal separation factor $\alpha$ for the membrane. The separation factors for asymmetrical films prepared from a series of polyalkylene sulfone resins are set forth subsequently.

Where oxygen-nitrogen mixtures having still higher concentrations of oxygen are desired, two or more units of the type illustrated in FIG. 3 can be connected in a series or cascade arrangement in which the oxygen-enriched oxygen/nitrogen mixture from a first unit is passed successively through a second or a series of such units. With each passage of the oxygen/nitrogen mixture through successive units, there will be a further oxygen enrichment of the oxygen/nitrogen mixture.

FIG. 4 is a side elevation of another form of apparatus for enriching a gas present in a gas mixture, e.g., oxygen in an oxygen/nitrogen mixture. The apparatus consists of a cylindrical chamber 90 which includes an interior chamber 90a. Tubing of the type shown in FIG. 2 and having an asymmetrical wall is employed as the membrane. As illustrated, the apparatus is shown as having a single tubular membrane. It will be recognized, of course, that the apparatus will contain many such tubular membranes running through the chamber 90a. The membrane includes a central elongated gas passageway 23, a main wall body 20 having a plurality of pores 22 therein, and a thin outer surface 24. The tubular member of the invention is encased in another tubular member 26 fabricated from material such as metal to provide rigidity and strength. Tube 26 includes a plurality of gas passageways 27.

In operation, an oxygen/nitrogen gas mixture under an elevated pressure is passed through central passageway 23. Both oxygen and nitrogen pass through the main body section 20 and the non-porous surface layer 24, and finally through openings 27 provided in tube 26. The oxygen-enriched oxygen/nitrogen mixture from chamber 90a exits the apparatus through line 91.

By minor structural modifications, the gas flow through the apparatus of FIG. 4 can be reversed. In such an embodiment, one end of the tubular membrane will be sealed. The initial oxygen/nitrogen gas mixture then will be introduced through line 91. The oxygen-enriched mixture will be withdrawn through gas passageway 23. The calculations of the total gas flux and the oxygen enrichment will be the same as discussed supra with respect to FIG. 3. Where additional oxygen enrichment is desired, two or more units as illustrated in FIG. 4 can be connected in a series or cascade arrangement.

The following examples are set forth to illustrate more clearly the principle and practice of the invention to those skilled in the art. Where parts or percentages are mentioned, they are parts and percentages by weight unless otherwise indicated.

EXAMPLE 1

Part A

A three-liter flask was mounted in a cooling bath filled with crushed ice and water. The flask was flushed free of oxygen and moisture by passing dry nitrogen through the flask for ten minutes. The flask then was charged with 1000 ml of ethanol and purged with dry nitrogen for an additional two-minute period. Liquified SO$_2$ in the amount of about 300 grams was charged to the flask over a period of about one hour. A charge of about 100 ml of hexene-1 then was charged to the flask with stirring. A dropping funnel was charged with 100 ml of hexene-1 having 1.6 ml of t-butyl hydroperoxide slurried therein. This solution was added dropwise over a twenty-minute period while the contents of the flask were being stirred. Polyhexene-1 sulfone began forming immediately as evidenced by the formation of a milky appearing emulsion. Stirring was continued for approximately ten hours. The reaction mixture then was allowed to remain in the flask over a sixteen-hour period with nitrogen being passed through the flask and with the reaction mixture being allowed to warm to room temperature. At the end of this period, the contents of the flask had a white polymer precipitate on the bottom and a clear supernatent liquid on the top.

The supernatant liquid was drawn off with an aspirator. The polymer was charged with fresh ethanol to a Waring blender. After vigorous mixing for a short period, the blender was turned off to permit the polymer to settle, and the ethanol was drawn off. The polymer then was mixed with an additional aliquot of fresh ethanol and permitted to stand for 24 hours. The polymer then was filtered and air-dried in a forced air oven at 50° C. over a period of five hours.

Part B

A polyalkylene sulfone resin was prepared from octene-1 employing the procedure described in Part A, above.

Part C

A polyalkylene sulfone resin was prepared from decene-1 employing the procedure described in Part A, above.

Part D

A polyalkylene sulfone resin was prepared from hexadecene-1 employing the procedure described in Part A, above.

EXAMPLE 2

An asymmetrical film of polyhexene sulfone was prepared from the polyhexene sulfone resin prepared in Example 1, Part A. Twenty-five parts of the resin were dissolved in 75 parts of a mixed solvent consisting of 60 weight % acetone and 40 weight % methanol. This resin solution was poured onto a glass plate and drawn down to form a thin film approximately 0.020" thick. After standing for approximately one minute, the glass plate was placed in a stirred bath containing methanol. After a one-hour period, the fully precipitated film was removed from the glass plate and thoroughly washed with water to remove any residual solvent. The asymmetrical film had a porous body containing a thin surface skin which was pore-free. A photomicrograph of a cross-section of the asymmetrical film at a magnification of 1500X is shown in FIG. 1.

EXAMPLE 3

A polymer casting solution was prepared by dissolving 21 parts of the polyoctene sulfone resin of Example 1, Part B in 79 parts of a solvent mixture containing 47 weight % tetrahydrofuran and 53 weight % ethanol. An asymmetrical film was prepared from this casting solution employing the same procedure set forth in Example 2. Ethanol was used as the precipitant in lieu of the methanol employed in Example 2.

EXAMPLE 4

A casting solution was prepared by dissolving 21 parts of the polydecene sulfone resin prepared in Example 1, Part C in 79 parts of a mixed solvent containing 55 weight % tetrahydrofuran and 45 weight % ethanol. An asymmetrical film was prepared from this casting solution employing the techniques described in Example 2, except that ethanol was used as the precipitant.

EXAMPLE 5

A casting solution was prepared by dissolving 25 parts of the polyhexadecene sulfone resin prepared in Example 1, Part D in 75 parts of a solvent mixture containing 35 weight % tetrahydrofuran and 65% weight % t-butanol. An asymmetrical film was prepared from this casting solution employing the techniques described in Example 2.

The flux of pure oxygen and the flux of pure nitrogen across the asymmetrical films prepared in Examples 2–5, inclusive, were measured employing a modification of the method described by Kammermeyer in *Modern Plastics*, July 1962, at page 135. In this method, a membrane of given cross-sectional area is placed in a filter holder. The gas whose flux is to be measured is introduced into a chamber on one side of the membrane. The other side of the membrane is a glass chamber of known volume fitted with a stopcock. A vacuum is drawn on the system and the pressure on the downstream side of the membrane is measured with a mercury manometer. The stopcock then is closed to isolate the system from the vacuum pump, and the change in downstream pressure as a function of time is noted. From the observed pressure change, the volume of gas flowing through the membrane can be calculated.

Both the oxygen flux and the nitrogen flux across each of the asymmetrical films prepared in Examples 2–5 were measured and are shown in Table II. For comparison purposes, the corresponding oxygen and nitrogen flux values through non-porous films 0.01 inch thick prepared from the polyalkylene resins of Example 1, Parts A–D are shown in Table II. The flux values for the non-porous films are values calculated by Formula (1), with the permeability constant P having been determined experimentally on films approximately 0.01 inch thick. Calculated values at a uniform film thickness were used so as to provide a uniform basis of comparison for each of the polyalkylene sulfone resins.

TABLE II

| Polymer | Non-Porous Film Data | | | Asymmetrical Film Data | | |
|---|---|---|---|---|---|---|
| | $O_2$ Flux[1] | $N_2$ Flux[1] | Separation Factor | $O_2$ Flux[1] | $N_2$ Flux[1] | Separation Factor $\alpha$ |
| PAS-6[2] | 0.02 | 0.005 | 4.0 | 1.02 | 0.26 | 3.9 |
| PAS-8[3] | 0.1 | 0.033 | 3.0 | 9.8 | 3.5 | 2.8 |
| PAS-10[4] | 0.19 | 0.074 | 2.5 | 11.7 | 4.5 | 2.6 |
| PAS-16[5] | 0.28 | 0.12 | 2.4 | 10.5 | 4.2 | 2.5 |

[1] $\times 10^{-6}$
[2] Resin prepared in Example 1, Part A Asymmetrical Film prepared in Example 2
[3] Resin prepared in Example 1, Part B Asymmetrical Film prepared in Example 3
[4] Resin prepared in Example 1, Part C Asymmetrical Film prepared in Example 4
[5] Resin prepared in Example 1, Part D Asymmetrical Film prepared in Example 5

From the data presented in Table II, it will be noted that the separation factor for each of the polyalkylene sulfone resins is identical (within experimental error) when employed either as a non porous film or as an asymmetrical film. This is the expected relationship as the premeability constant, i.e., P in formula (1), is a fundamental property of the resin itself. If the measured separation factor for the asymmetrical film is lower than the value shown in Table II, this is evidence that the skin of the asymmetrical film has pinholes therein.

The fluxes for both oxygen and nitrogen are materially higher through the asymmetrical films. As a specific example, the oxygen flux in the asymmetrical film prepared from the polyhexene sulfone was $1.02 \times 10^{-6}$, while the oxygen flux through the non-porous film was $0.02 \times 10^{-6}$. This very large difference in flux is accounted for by the fact that the pore-free skin of the asymmetrical film was materially thinner than the film employed as the control. The asymmetrical film had a physical strength substantially equivalent to that of a solid film 0.01 inch thick prepared from the same resin. These factors clearly indicate that the asymmetrical film will be much more efficient than a conventionally prepared film for use as a membrane in enriching the oxygen content of an oxygen/nitrogen gas mixture by passing such a mixture through a membrane.

While the articles, processes, and apparatus herein described constitute preferred embodiments of the invention, it is to be understood that the invention is not limited to these precise articles, processes, and apparatus, and that changes may be made therein without departing from the scope of the invention which is defined in the appended claims.

What is claimed is:

1. A method for preparing an asymemtrical layered structure of a polyalkylene sulfone resin which consists essentially of the sequential steps:
    (a) forming a thin layer of a solution of polyalkylene sulfone resin;
    (b) evaporating solvent from the surface layer of the solution of (a) to lower the solubility of the polyalkylene sulfone resin in said surface layer;
    (c) contacting the article of (b) with a water-miscible precipitant to precipitate essentially all of the polyalkylene sulfone contained in the layered structure formed in (b) to form an article; and
    (d) contacting the article formed in (c) with a non-solvent and/or water for a time period sufficient to extract therefrom essentially all of the polyalkylene sulfone solvent;

the polyalkylene sulfone, the solution thereof and the solvents therefor having the following limitations:

- (e) the polymerized alkylene in said polyalkylene sulfone resin is an alpha alkylene which contains 6 to 18 carbon atoms;
- (f) the solution of (a) is essentially saturated with polyalkylene sulfone and contains therein:
  - (i) A water-miscible organic solvent which will dissolve therein at ambient temperature at least about 30 parts by weight of said polyalkylene sulfone resin in 100 parts by weight of said solvent; and
  - (ii) A non-solvent miscible with both water and the solvent of (f) (i), said non-solvent having the capacity of dissolving at ambient temperature not more than about 1 part by weight of said polyalkylene sulfone resin in 100 parts by weight of said non-solvent, said non-solvent having an atmospheric pressure boiling point at least about 5° C. higher than the atmospheric pressure boiling point of the solvent of (f) (i), and
- (g) the water-miscible precipitant employed in (c) also is miscible with both the solvent of (f) (i) and the non-solvent of (f) (ii) and has the capacity of dissolving at ambient temperature not more than about 1 part of weight of said polyalkylene sulfone resin in 100 parts by weight of said precipitant.

2. A process of claim 1 in which the solvent component of the polyalkylene sulfone resin solution has an atmospheric pressure boiling point not higher than about 70° C.

3. A process of claim 1 in which the polyalkylene sulfone resin solution includes as the solvent an aliphatic ketone or an ether, and as the non-solvent an alkanol.

4. A process of claim 3 in which the solvent is acetone.

5. A process of claim 3 in which the solvent is tetrahydrofuran.

6. A process of claim 1 in which the polyalkylene sulfone resin solution employed in step (a) contains about 20-25 weight % of said polyalkylene sulfone resin.

7. A process of claim 3 in which the polyalkylene sulfone resin solution employed in step (a) contains about 20-25 weight % of said polyalkylene sulfone resin.

8. A process of claim 4 in which the polyalkylene sulfone resin solution employed in step (a) contains about 20-25 weight % of said polyalkylene sulfone resin.

9. A process of claim 5 in which the polyalkylene sulfone resin solution employed in step (a) contains about 20-25 weight % of said polyalkylene sulfone resin.

10. A method for preparing an asymmetrical layered structure of a polyalkylene sulfone resin which consists essentially of the sequential steps:

- (a) forming a thin layer of a saturated solution of polyalkylene sulfone resin in which the alkylene group contains 6 to 18 carbon atoms, the solution containing a water-miscible organic solvent which will dissolve therein at ambient temperature at least about 30 parts by weight of said polyalkylene sulfone resin in 100 parts by weight of said solvent; and a non-solvent miscible both water and the solvent of water-miscible solvent, said non-solvent having the capacity of dissolving at ambient temperature not more than about 1 part by weight of said polyalkylene sulfone resin in 100 parts by weight of said non-solvent, said non-solvent having an atmospheric pressure boiling point at least about 5° C. higher than the atmospheric pressure boiling point of the water-miscible solvent;
- (b) evaporating solvent from the surface layer of the solution of (a) to lower the solubility of the polyalkylene sulfone resin in said surface layer;
- (c) contacting the layer of (b) with a water-miscible precipitant to precipitate essentially all of the polyalkylene sulfone contained in the layered structure formed in (b) to form an article, the water-miscible precipitant employed in (c) also is miscible with both the water-miscible solvent and the non-solvent and has the capacity of dissolving at ambient temperature not more than about 1 part by weight of said polyalkylene sulfone resin in 100 parts by weight of said precipitant; and
- (d) contacting the article formed in (c) with a non-solvent and/or water for a time period sufficient to extract therefrom essentially all of the polyalkylene sulfone solvent to provide the asymmetrical structure which has an oxygen permeation flux of at least about $1 \times 10^{-7}$ (cm$^3$ at STP)·cm$^{-1}$·sec$^{-1}$·cm Hg$^{-1}$ as measured across an area of 1 cm$^2$ at a pressure differential of 1 cm Hg.

* * * * *